US007870437B2

United States Patent
Swaine et al.

(10) Patent No.: US 7,870,437 B2
(45) Date of Patent: Jan. 11, 2011

(54) TRACE DATA TIMESTAMPING (75) Inventors: Andrew Brookfield Swaine, Cambridge (GB); Richard Roy Grisenthwaite, Guilden Morden (GB); Michael John Williams, Ely (GB)

(73) Assignee: ARM Limited, Cambridge (GB)

( * ) Notice: Subject to any disclaimer, the term of this patent is extended or adjusted under 35 U.S.C. 154(b) by 481 days.

(21) Appl. No.: 11/984,221

(22) Filed: Nov. 14, 2007

(65) Prior Publication Data
US 2009/0125756 A1 May 14, 2009

(51) Int. Cl.
G06F 11/00 (2006.01)
(52) U.S. Cl. ..................................................... 714/45
(58) Field of Classification Search ............. 714/25–30, 714/32, 36–39, 44–46
See application file for complete search history.

(56) References Cited

U.S. PATENT DOCUMENTS

| | | | | |
|---|---|---|---|---|
| 5,642,478 A * | 6/1997 | Chen et al. | ..................... | 714/45 |
| 5,903,719 A * | 5/1999 | Yamamoto | ................... | 714/38 |
| 6,055,651 A * | 4/2000 | Sasaki et al. | .................. | 714/45 |
| 6,763,385 B1 * | 7/2004 | Orfali | ......................... | 709/224 |
| 6,883,162 B2 * | 4/2005 | Jackson et al. | ............... | 717/124 |
| 7,069,176 B2 | 6/2006 | Swaine et al. | | |
| 7,162,410 B1 * | 1/2007 | Nemecek et al. | ............... | 703/28 |
| 7,213,169 B2 * | 5/2007 | Dodson et al. | ................ | 714/30 |
| 7,437,619 B2 * | 10/2008 | McCullough et al. | ......... | 714/45 |
| 2002/0188831 A1 * | 12/2002 | Jackson et al. | ............... | 712/227 |
| 2006/0075310 A1 * | 4/2006 | Tagawa | ....................... | 714/45 |
| 2007/0294590 A1 * | 12/2007 | Agarwala et al. | ............. | 714/45 |

* cited by examiner

Primary Examiner—Nadeem Iqbal
(74) Attorney, Agent, or Firm—Nixon & Vanderhye P.C.

(57) ABSTRACT

A data processing apparatus is provided, comprising monitored circuitry for performing activities, trace circuitry for producing a stream of trace elements representative of at least some of these activities, and detection circuitry for detecting the occurrence of a predetermined subset of the activities for which the trace circuitry is producing trace elements. When an activity in that predetermined subset of activities is detected a timing indication is added to the stream of trace elements. Hence, the valuable trace bandwidth- may be preserved, by limiting the trace elements for which a timing indication is added into the trace stream to a predetermined subset of the activities for which trace elements are generated, and the valuable global or relative timing accuracy of those activities represented in the trace stream is retained, without flooding the trace stream with timing indications.

17 Claims, 7 Drawing Sheets

TRACE DATA TIMESTAMPING

TECHNICAL FIELD

The technical field relates to the generation of trace data within a data processing apparatus, and more particularly, to timestamping generated trace data.

BACKGROUND

Tracing the activity of data processing systems whereby a stream of trace elements (also called "trace data") is generated, including data representing the step-by-step activity within the system, is a highly useful tool in system development. However, with the general move towards more deeply embedded processor cores, it becomes more difficult to track the activities of the processor core or other on-chip devices via externally accessible pins. Accordingly, as well as off-chip tracing mechanisms for capturing and analysing trace data, increased amounts of tracing functionality are being placed on-chip. An example of such on-chip tracing mechanisms is the Embedded Trace Macrocell (ETM) provided by ARM Limited, Cambridge, England, in association with a variety of their ARM processors.

Such tracing mechanisms produce in real-time a stream of trace elements representing activities of the data processing apparatus that are desired to be traced. This trace stream can then subsequently be analysed for a variety of purposes, for example to facilitate debugging of sequences of processing instructions being executed by the data processing apparatus, for performing profiling operations in order to determine the performance of particular program code being executed on the data processing apparatus, and so on.

Typically, the stream of trace elements that is generated by the trace mechanism is buffered prior to output for subsequent analysis. Such a trace buffer is able to store a finite amount of information and requires a dedicated data bus which has a finite bandwidth over which the elements to be buffered can be received. The trace buffer is generally arranged to store information in a wrap-around manner, i.e. once the trace buffer is full, new data is typically arranged to overwrite the oldest data stored therein. It has been found that the bandwidth of the dedicated data bus limits the rate at which information can be stored in the trace buffer.

Typically, a trace analysing tool is provided which receives the stream of trace elements from the trace buffer when desired, for example once the trace has completed. The trace analysing tool can then be used to reconstruct the activities of the device being traced based on the received trace elements. As devices such as processor cores increase in power and complexity, it is clear that the amount of information required to trace the activities of such devices will increase, and accordingly there will potentially be a very large volume of trace elements that need to be traced.

However, there is a problem that there is finite bus bandwidth over which the trace elements can be output by trace logic, and any trace buffer used to buffer such trace elements will have a finite size. Accordingly, the volume of trace elements that can be generated is limited. The activities of a device that might want to be traced include, but are not limited to, the instructions being executed by a processor core (referred to as instruction trace), and the memory accesses made by those instructions (referred to as data trace). These activities may be individually traced or traced together, so that the data trace can be correlated with the instruction trace. The data trace itself consists of two parts, the memory addresses and the data values, referred to (respectively) as data address and data value trace. Again, the existing trace ETM protocols allow for data address and data value tracing to be enabled independently or simultaneously.

Current ETM logic can also be arranged to provide a cycle accurate mode of operation, in which further information is included within the trace stream to indicate each clock cycle, whereby a clock cycle indication is produced for each trace element generated. When subsequently analysing the trace elements within the trace stream, an indication of the clock cycle in which the associated activity took place within the trace device can be determined. Whilst such a cycle accurate mode of operation can be useful in many situations it significantly increases the volume of trace data produced. In situations where the volume of trace data being produced is already very large, the extra increase in volume resulting from performing cycle accurate trace can cause significant problems having regard to the finite bus bandwidth over which the trace elements can be output by the trace logic, and the finite size of the trace buffer used to buffer such trace elements.

Commonly assigned U.S. Pat. No. 7,069,176, incorporated herein by reference, discloses a data processing apparatus generating a trace data stream into which both global timestamps (i.e. with reference to an external clock source) and local timestamps (i.e. with reference to an internal clock) may be added.

It would be desirable to provide an improved technique for generating a stream of trace elements, so as to enable more effective use to be made of the finite bus bandwidth over which the trace elements can be output, and the finite size of any trace buffer in which those trace elements are buffered.

SUMMARY

Viewed from a first aspect, the technical described herein provides a data processing apparatus comprising: monitored circuitry for performing activities; trace circuitry for producing a stream of trace elements representative of at least some of said activities; and detection circuitry for detecting occurrence of a predetermined subset of said activities for which said trace circuitry is producing trace elements and to cause a timing indication to be added to said stream of trace elements in association with the trace elements representative of said predetermined subset of activities.

The present technique recognises that when generating trace data for a data processing apparatus, useful trace data may be produced in which only a subset of the traced activities of the data processing apparatus are associated with a timing indication, allowing subsequent analysis of the trace data to correlate in time these activities with one another. For clarity it is noted that a "strict" subset is intended here, i.e. there are also traced activities of the data processing apparatus for which no timing indication is produced. Thus, by causing a timing indication to be added to the stream of trace elements produced for only a subset of the activities of the data processing apparatus already being traced, a reduction in the bandwidth of trace data output is achieved, whilst retaining the timing indication in association with those activities of the data processing apparatus that will require associated timing information when later analysed.

The technology described herein is useful in a variety of situations. For example, the inventors realised that in a data processing system in which techniques such as pipelining, write buffering, caching, speculation and/or out-of-order execution have been introduced to improve performance, situations arise where the information included in the trace stream indicative of each elapsed clock cycle is not at accurate as expected, and can become misleading when studying or debugging the activities of the data processing system as a whole, and furthermore is an expensive use of trace bandwidth. By the disclosed technique, the user can concentrate on particular activities of interest that are being traced, especially those where timing indications have been found to provide useful information, despite the use of the above-mentioned performance enhancing techniques.

Another situation where the technology described herein is particularly useful is in a multi-processor system. As data processing systems increase in complexity it is becoming common to use system-on-chip designs including multiple processing components, each component performing its own data processing operations and communicating with the other processing components, for example, a single integrated circuit may comprise several processor cores and/or digital signal processors. In such multi-component systems each processing component can be separately traced and will thus generate its own trace data stream, leading to a very large combined volume of trace data, particularly if it is cycle-accurate.

The inventors realised that a problem with the analysis of trace data streams produced by different processing components is that each processing component generates trace data in dependence upon an associated local clock signal. Consequently, producing cycle accurate trace data streams from each trace data source in order to correlate in time the activities of the different processing components consumes a great deal of trace bandwidth. What is more, if at least one processing component is complex, then often a shared memory to which each processing component has access will be weakly ordered and knowing the precise order in which each instruction was executed is not so interesting.

The technology described herein allows the user to concentrate on particular activities of interest, for example the execution of a barrier instruction, the barrier instruction ensuring that the effects of instructions before the barrier instruction are perceived from outside the processing component executing it to occur before effects of instructions after said barrier instruction. In a multi-processor system, such instructions make useful synchronisation points to ensure that certain activities of respective processors occur in a predetermined order. Hazards such as read-before-write may be avoided in this way.

Typically, the monitored circuitry produces a stream of data elements representative of its activities, from which the stream of trace elements is generated. According to one example embodiment, the detection circuitry detects the occurrence of the predetermined subset of activities from observation of the stream of data elements. This means that the existing arrangement of known, data element generating monitored circuitry can be used in the data processing apparatus of this embodiment to produce a stream of data elements, without the need for modification. According to an alternative example embodiment, the detection circuitry is associated with the monitored circuitry and the detection circuitry detects the occurrence of the predetermined subset of activities from observation of the monitored circuitry, then adding at least one data element to the stream of data elements in order to cause the timing indication to be added to the stream of trace elements. In this arrangement the detection circuitry can more directly monitor the activities of the monitored circuitry and the trace circuitry can simply add a timing indication to the stream of trace elements when that at least one data element is recognised in the stream of data elements.

It will be appreciated that the predetermined subset of activities for which a timing indication is added to the stream of trace elements could comprise a variety of activities. However, in one embodiment the monitored circuitry comprises one or more processing units for executing instructions, and the predetermined subset of activities comprises execution of one or more predetermined instructions by the one or more processing units of the monitored circuitry. Accordingly, a timing indication may be added to the stream of trace elements when particular instructions are executed by the monitored circuitry. Advantageously, when the predetermined subset of activities comprises execution of one or more predetermined instructions by the monitored circuitry, the detection circuitry may detect occurrence of one or more predetermined instructions from observation of instruction decoding in the monitored circuitry. This represents a particularly direct manner of identifying the occurrence of particular instructions within the monitored circuitry.

In one example embodiment one of the one or more predetermined instructions is a barrier instruction, the barrier instruction ensuring that the effects of instructions before the barrier instruction are perceived from outside the processing unit executing said barrier instruction to occur before effects of instructions after said barrier instruction. In a data processing apparatus in which the order in which instructions are executed varies from the order in which those instructions are included in program code, a barrier instruction is a useful tool when including timing indications in trace data, to provide reliable observation points for the temporal activity of the data processing apparatus in the trace stream.

In another example embodiment, the predetermined subset of activities comprises access to at least one predetermined memory location by the monitored circuitry. In this way, when seeking to study or debug the activity of the monitored circuitry with respect to memory accesses, the trace stream may include timing indications for accesses to specific memory locations.

Although the timing indication could be added to the stream of trace elements on the occurrence of a range of activities of the monitored circuitry, in one embodiment the predetermined subset of activities comprises a procedure call and/or a procedure return. Thus, the points in the execution of program code where the program flow jumps to, or returns from, a specified procedure may be identified with timing accuracy.

It will be appreciated that there are a variety of ways in which the timing indication added to the stream of trace elements could be implemented. In addition to the timing indications triggered by a predetermined subset of traced activities of the monitored circuitry, in one example embodiment, an absolute timestamp relative to a global clock source is included as an additional timing indication in the trace elements if a predetermined period elapses without an activity in the predetermined subset of activities being detected. This ensures an upper limit on the period for which no timing information is provided in the trace stream. The timing indication added to the stream of trace elements upon detection of one of the predetermined subset of activities could itself be an absolute timestamp or, in an alternative example embodiment, could comprise an indication of time elapsed since a previous timing indication.

Whilst the technology described herein could be used in a system comprising stand-alone trace circuitry, it is particularly well suited to systems comprising more than one item of monitored circuitry and more than one trace circuitry associated therewith. Correlation between the streams of trace elements produced by more than one trace circuitry can be achieved whereby when said trace circuitry causes a timing indication to be included in the stream of trace elements, a timing signal is issued to further trace circuitry. One trace circuitry could respond in a variety of ways to a received timing signal, but in one embodiment the trace circuitry is further configured to receive a timing signal from further trace circuitry and on receipt of that timing signal to cause a timing indication to be included in the stream of trace elements. By this arrangement, a timing indication in the stream of trace elements from one trace circuitry may be correlated with a timing indication in the stream of trace elements from a further trace circuitry, allowing the respective activities of the monitored circuitries to also be correlated.

According to a second aspect of the technology described herein, there is provided a data processing system comprising a first data processing apparatus and a second data processing apparatus, wherein each of the first data processing apparatus and second data processing apparatus are a data processing apparatus according to the first aspect By such an approach, the respective activities of the first and second data processing. apparatuses can be correlated in time for particular activities of interest.

A trace analysing apparatus may advantageously be provided in association with such a data processing system, for receiving a trace stream from each of the first and second data processing apparatuses, the trace analysing apparatus correlating the trace streams on the basis of timing indications in each stream to provide correlated trace streams indicative of the activities of the monitored circuitry of each data processing apparatus. A programmer seeking to understand the behaviour of the data processing system may thus gain greater understanding of the relative temporal activities of the first and second data processing apparatuses by reference to the correlated trace streams.

Viewed from a third aspect, the technology described herein provides a method of operating a data processing system, comprising the steps of: performing activities; producing a stream of trace elements representative of at least some of said activities; detecting occurrence of a predetermined subset of said activities for which said producing step produces trace elements; and causing a timing indication to be added to said stream of trace elements in association with the trace elements representative of said predetermined subset of activities.

Viewed from a fourth aspect, the technology described herein provides a data processing apparatus comprising: monitored means for performing activities; trace means for producing a stream of trace elements representative of at least some of said activities; and detection means for detecting occurrence of a predetermined subset of said activities for which said trace means is producing trace elements and for causing a timing indication to be added to said stream of trace elements in association with the trace elements representative of said predetermined subset of activities.

DETAILED DESCRIPTION

Figure 1:
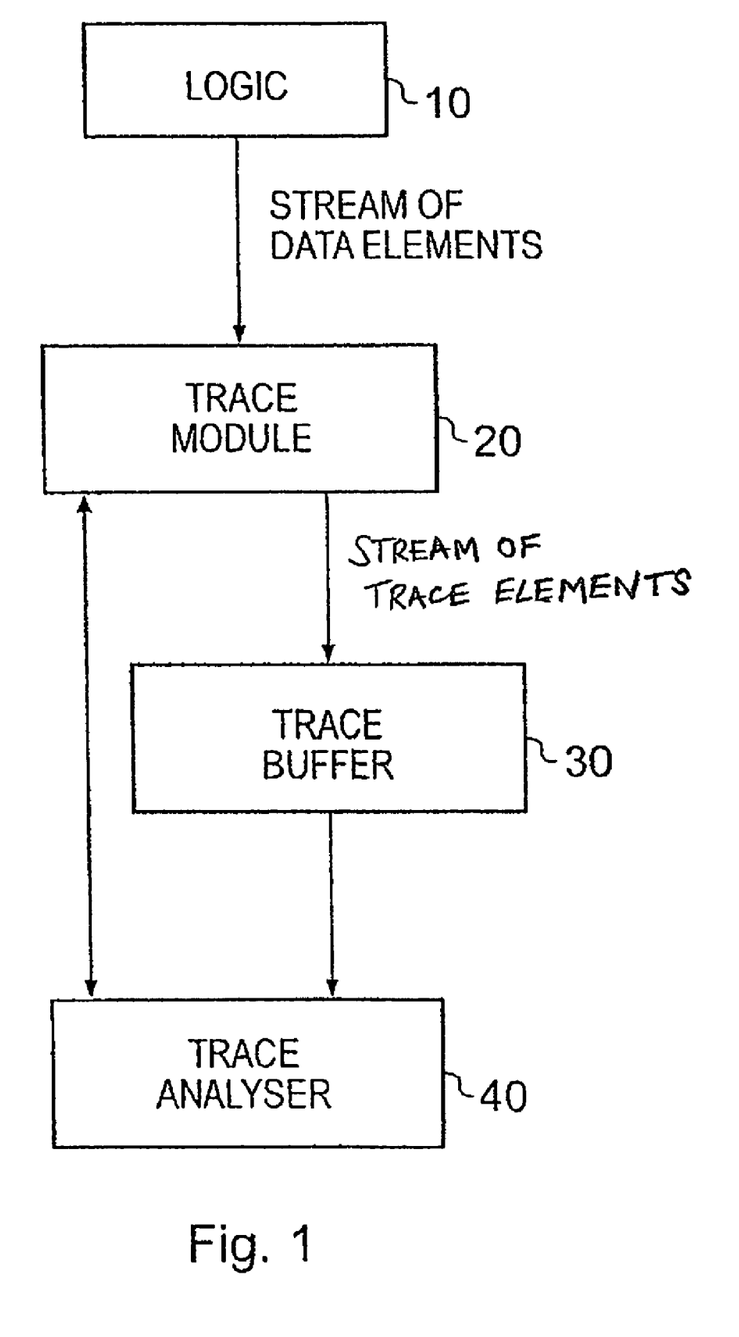
FIG. 1 is a block diagram of a data processing system in accordance with one example embodiment.

FIG. 1 schematically illustrates a data processing system providing logic 10, a trace module 20, a trace buffer 30 and a trace analyser 40. Whilst FIG. 1 illustrates a data processing system providing a trace buffer 30, in alternative embodiments the trace module 20 may pass its output straight to the trace analyser 40, without going via a trace buffer.

The logic 10 producing the stream of data elements received by the trace module 20 can take a variety of forms, and may for example be a processor core, a Direct Memory Access (DMA) engine, a data engine/accelerator, etc. Alternatively, the logic 10 may consist of a plurality of devices coupled by a bus, and the data elements may be monitored by the trace module 20 as they pass over the bus.

The trace analyser 40, which may in one embodiment be formed by a general purpose computer running appropriate software, is coupled to the trace module 20 and the trace buffer 30. The trace module 20, typically embodied on-chip, is arranged to receive data elements from logic 10 and dependent thereon produces a stream of trace elements which are stored in the trace buffer 30 (which may be provided on or off-chip). The trace analyser 40, typically embodied off-chip, is then used to analyse that stream of trace elements in order to derive information indicative of the activities of the logic being traced 10. In particular, from analysis of the stream of trace elements, the detailed activity of the logic 10 can be determined. The trace analyser 40 is connected to trace module 20 to enable certain features of the trace module to be controlled by the user of the trace analyser. Additionally, in some embodiments, the stream of trace elements produced by the trace module 20 may be provided directly to the trace analyser 40 rather than being buffered in the trace buffer 30.

Figure 2:
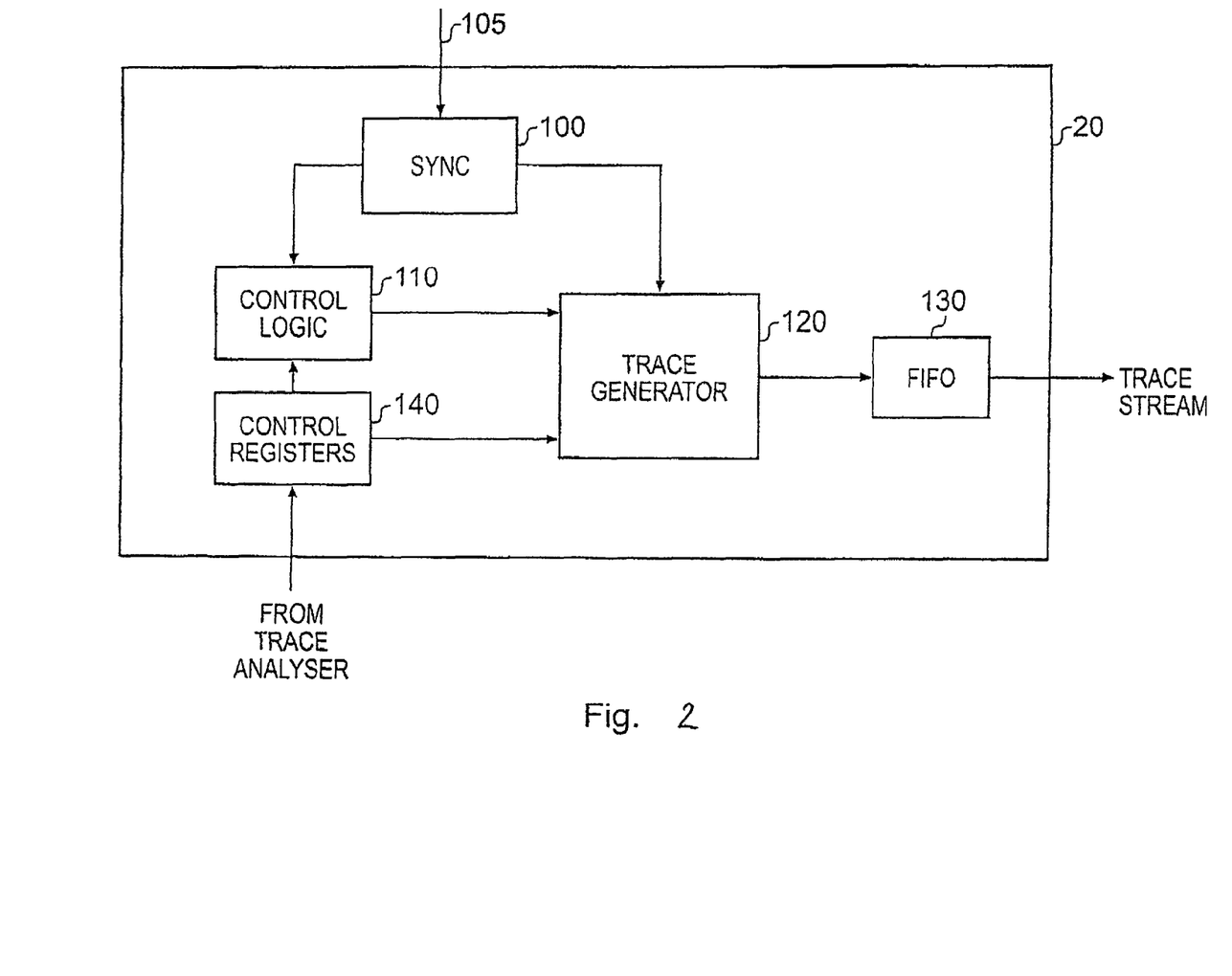
FIG. 2 is a block diagram illustrating in more detail the on-chip trace module of FIG. 1.

FIG. 2 is a block diagram of the trace module 20 in accordance with one embodiment. The trace module 20 is arranged to receive over path 105 data elements indicative of the state or operation of the logic being traced. The sync logic 100 is arranged to convert the incoming signals into internal versions of the signals more appropriate for use within the trace module 20. These internal versions are then sent to the control logic 110 and the trace generation logic 120, although it will be appreciated that the control logic 110 and the trace generation 120 will not necessarily need to receive the same signals. Fundamentally, the control logic 110 needs to receive data relating to triggerable activities, for example execution of particular instructions, access to particular memory locations, etc. so that it can determine whether trace should be activated, and what types of data elements should be traced. It then issues appropriate control signals to the trace generation logic 120 to cause the required trace elements to be generated by the trace generation logic 120. The trace generation logic 120 receives via the sync logic 100 any data that would need to be traced dependent on the control signals issued by the control logic 110.

In accordance with example embodiments, control registers 140 are provided which are used to configure the operation of the control logic 110, these control registers 140 being settable from the trace analyser 40. A number of control registers can be provided, which fundamentally direct two elements of the trace generation logic operation—"when" to generate trace elements, e.g. when a particular range of addresses is accessed, and "what" to generate those trace elements for, e.g. the data address and/or data value of a particular transfer and, typically, supplementary information about the transfer such as whether it is a read or a write operation, whether it is locked, security information etc.

Triggered by a control signal issued by the control logic 110 that a "when" condition is met, the trace generation logic 120 generates the required trace elements indicative of the data elements it is receiving from the sync logic 100, in accordance with the associated "what" signal it also receives from the control logic. These generated trace elements are output to the FIFO 130. From here, the trace stream is then output to the trace buffer 30, or in alternative embodiments is output directly to the trace analyser 40.

In accordance with example embodiments, the trace generator 120 is arranged, in addition to the usual trace elements, to produce a trace timing indication which is then included in the trace stream, each trace timing indication being added to the trace stream in association with a subset of the activities for which the trace elements are being generated.

In one embodiment the trace generator 120 comprises detection circuitry configured to identify, from amongst the activities for which the control logic has indicated that trace elements should be generated, the subset of those activities for which a timing indication should be added to the trace stream. This subset may be fixed, but in example embodiments is advantageously configurable by means of the control logic and/or control registers.

In many embodiments, the trace generator 120 is arranged, prior to outputting the required trace elements, to perform compression techniques in order to produce a compressed trace stream for output to the FIFO 130, thus the amount of information that needs to be passed off-chip can be significantly reduced, saving trace bandwidth.

The trace stream is received by trace analyser 40. The programmer of this data processing system can make use of the trace analyser 40 to study the behaviour of the data processing system when executing program code. In particular, by having timing indications available in the trace stream associated with a predetermined subset of activities of the monitored circuitry for which trace elements are being produced, the programmer may more easily study the behaviour of the data processing system. For example, for a programmer seeking to analyse the behaviour of a data processing system in which techniques such as pipelining, write buffering, caching, speculation and/or out-of-order execution are implemented, the task is advantageously simplified by selecting only a predetermined subset of traced activities to have timing indications associated with their corresponding trace elements. When such techniques are implemented, the actual ordering of many specific activities of the data processing system may vary from that expected from a "sequential execution model", yet for a programmer studying the behaviour of the system as a whole, much of this detail may be irrelevant and indeed full "cycle-accurate" trace information may become inaccurate.

Figure 3:
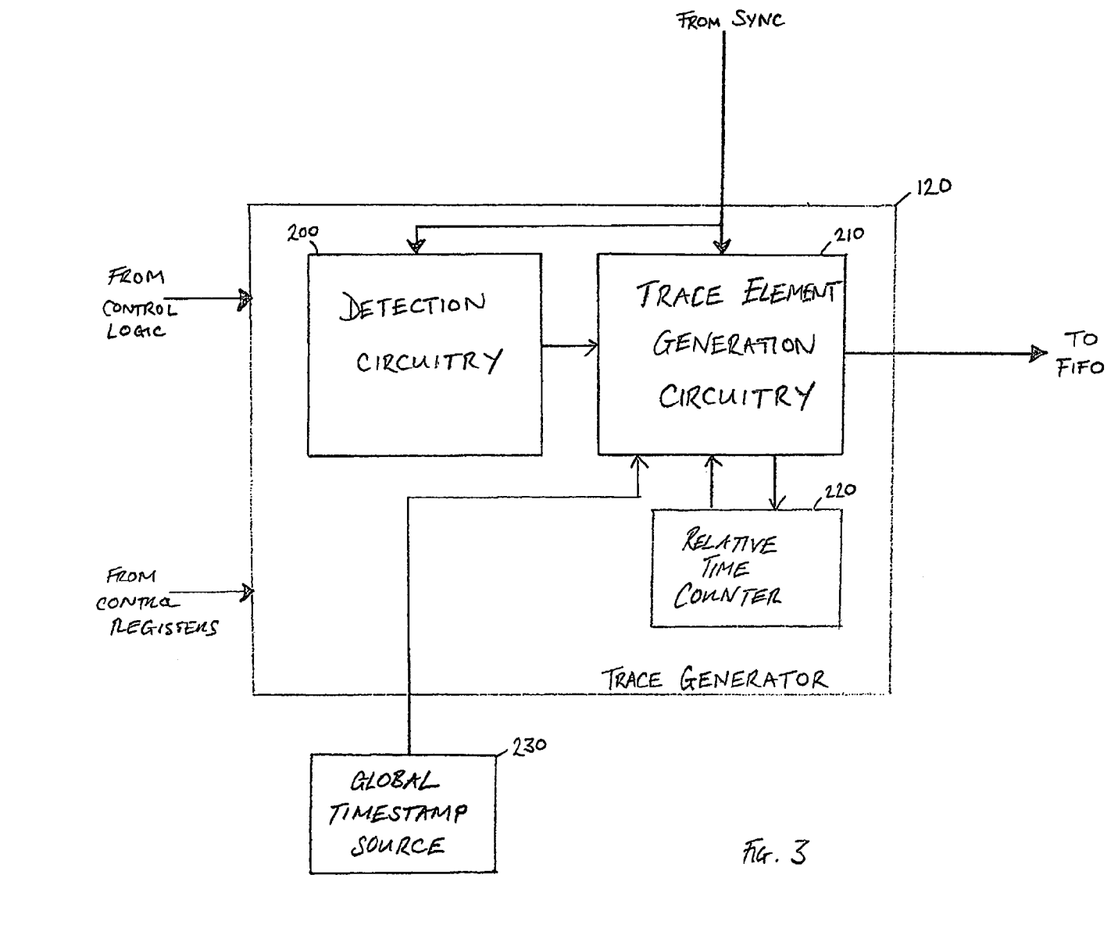
FIG. 3 is a block diagram illustrating in more detail the trace generator of FIG. 2.

FIG. 3 is a block diagram of the trace generator 120 in accordance with one embodiment, comprising detection circuitry 200, trace element generation circuitry 210 and relative time counter 220. Also shown is global timestamp source 230, external to trace generator 120. Each of the components of trace generator 120 are configurable by signals received from control logic 110 and/or control registers 140.

Detection circuitry 200 and trace element generation circuitry 210 receive data elements indicative of the activities of the monitored circuitry (logic 10), via sync logic 100. Trace element generation circuitry 210 generates the stream of trace elements, which are passed to FIFO 130 for buffering, before being passed off-chip. This trace element generation is performed in accordance with the configuration dictated by control logic 110 and/or control registers 140.

Detection circuitry 200 identifies from the data elements the occurrence of particular activities of logic 10, these particular activities being a subset of the activities for which trace element generation circuitry 210 is generating trace elements. When data elements indicative of these particular activities are detected by detection circuitry 200, it signals to trace element generation circuitry 210 that a timing indication should be added to the stream of trace elements in association with the trace elements being generated representative of those activities. Examples of the particular activities detected from the data elements by detection circuitry 200 could be execution of a specific instruction by logic 10 (e.g. a procedure call or a procedure return), an access to a particular address (or range of addresses) in memory, and so on. A further example of an activity of logic 10, which could be identified by detection circuitry 200 as part of the subset, is the execution of a barrier instruction. Execution of a barrier instruction by logic 10, as one of a series of instructions being executed, ensures that the effects of instructions coming before the barrier instruction in that series are perceived from outside the processing unit in logic 10 executing that barrier instruction to occur before the effects of instructions after the barrier instruction. Such barrier instructions are useful when externally observing the activity of a data processing apparatus which implements out-of-order instruction execution, to be able to identify specific way markers in the progression of the data processing apparatus through program code. This may be of particular benefit when observing the activity of a data processing apparatus comprising multiple processors, each of which implements out-of-order instruction execution. This is discussed below with reference to FIG. 7.

In one embodiment, detection circuitry 200 is arranged to detect the execution of particular instructions by the processor core by monitoring the instruction decoding carried out within processor core 300, information in the data elements being indicative of the instruction decoding occurring in the processor core.

There are various ways that trace element generation circuitry 210 can add a timing indication to the trace elements that it generates. The timing indication associated with the particular activity detected by detection circuitry 200 could be a global timestamp. In the embodiment illustrated in FIG. 3, trace element generation circuitry 210 receives a global timestamp signal from global timestamp source 230, from which it can generate a global timestamp timing indication within the trace elements. In one embodiment, trace element generation circuitry 210 also makes reference to global timestamp source 230 to add a global timestamp timing indication to the trace elements under certain conditions, even if none of the subset of activities has been detected by the detection circuitry 200. This can, for example, be done if a predetermined time period elapses without an activity in the subset of activities being detected by the detection circuitry 200 (and hence no timing indication having been added to the trace stream), or could more simply be done at predetermined time intervals (regardless of other timing indications being added in association with the subset of activities).

In another embodiment, trace element generation circuitry 210 is connected to relative time counter 220, enabling trace element generation circuitry 210 to add a relative timing indication to the trace elements. Global timestamp timing indications can also still be added under certain conditions, such as a predetermined time period having elapsed without an activity in the subset of activities being detected by the detection circuitry. The relative timing indication can, for example, be relative to a previous global timestamp timing indication added to the trace elements, or, as another example, can be relative to a previous relative timing indication added to the trace elements. For this reason, relative time counter 220 receives signals from the trace element generation circuitry, so that it can reset and/or start a timing counter when a timing indication (global or relative) is added to the trace stream.

Figure 4:
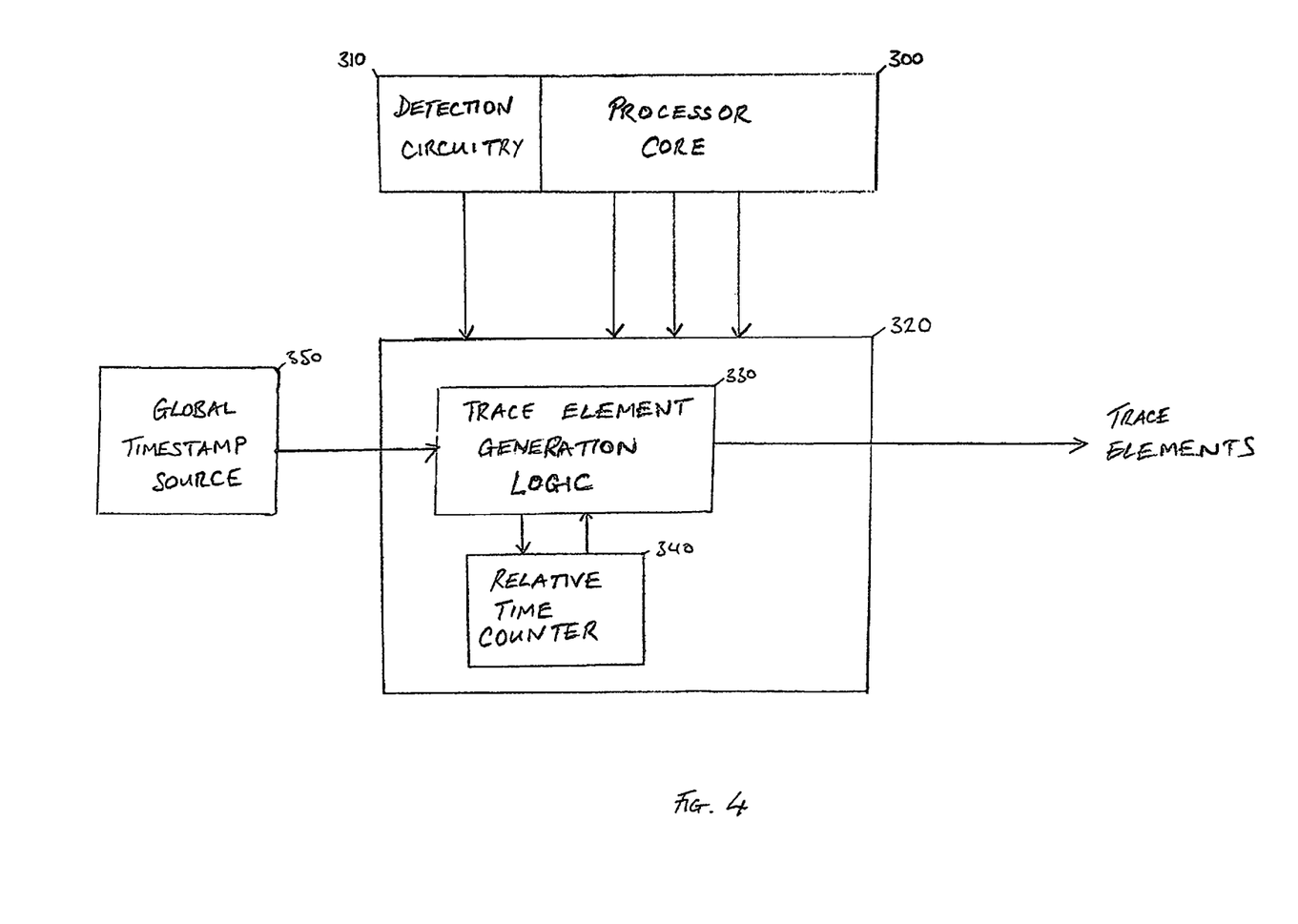
FIG. 4 is a block diagram of a data processing system in accordance with one example embodiment.

FIG. 4 is a block diagram of a data processing apparatus in accordance with another example embodiment. Processor core 300 has associated detection circuitry 310, both of which are connected to trace module 320. Similarly to as discussed with reference to FIG. 3, trace element generation logic 330 receives timing information both from global timestamp source 350 (external to the trace module) and relative time counter 340 (internal to the trace module), and generates a stream of trace elements to be passed off-chip.

In this embodiment, detection circuitry 310 is associated with processor core 300, enabling the detection of the predetermined subset of activities to take place by more directly monitoring the activities of the processor core. This provides a particularly direct arrangement for the detection circuitry 310 to detect the execution of particular instructions by the processor core, for example by monitoring the instruction decoding carried out within processor core 300.

Detection circuitry 310 is connected to trace module 320. In one embodiment, the detection circuitry makes use of the connection passing the stream of data elements indicative of the activities of the processor core to trace module 320 by adding additional data elements to the stream, signalling to the trace element generation logic 330 when a timing indication should be added to the stream of trace elements. In another embodiment, the detection circuitry is provided with a dedicated connection to the trace module 320, over which it may signal -to the trace element generation logic 330 when a timing indication should be added to the stream of trace elements.

Figure 5:
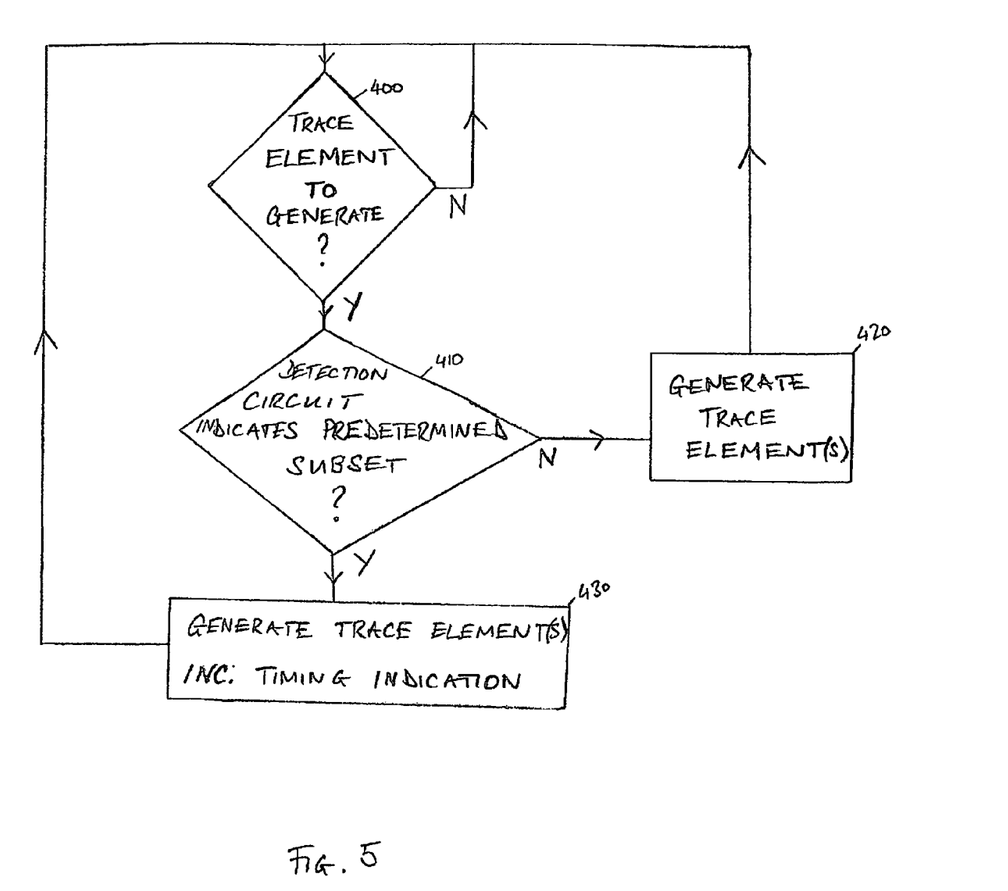
FIG. 5 is a flow diagram illustrating a sequence of steps performed within the trace generator of FIG. 3 in order to produce a stream of trace elements.

FIG. 5 is a flow diagram providing an overview of the activities of the trace generator 120. It should be noted that the sequence of steps is described here with reference to the embodiment illustrated FIG. 3, but a similar series of steps is carried out by the trace generators in other example embodiments (e.g. that illustrated in FIG. 4). At step 400 the trace element generation circuitry 210 determines if there is a trace element to be generated from the stream of data elements it is receiving. If not then the flow loops back to this step until a trace element needs generating. When a trace element needs generating, then at step 410 it is determined if the signal received by the trace element generation circuitry 210 from detection circuitry 200 indicates that the activity of which that trace element is indicative is one of the predetermined subset of activities. If it is not, then at step 420 the trace element generation circuitry 210 generates the trace element (or trace elements) corresponding to that activity and the flow returns to step 400. If however the signal received from detection circuitry 200 indicates that the activity is indeed one of the predetermined subset of activities, then at step 430 the trace element generation circuitry 210 generates the trace element (or trace elements) corresponding to that activity, including therewith a timing indication. The flow then returns to step 400.

Figure 6:
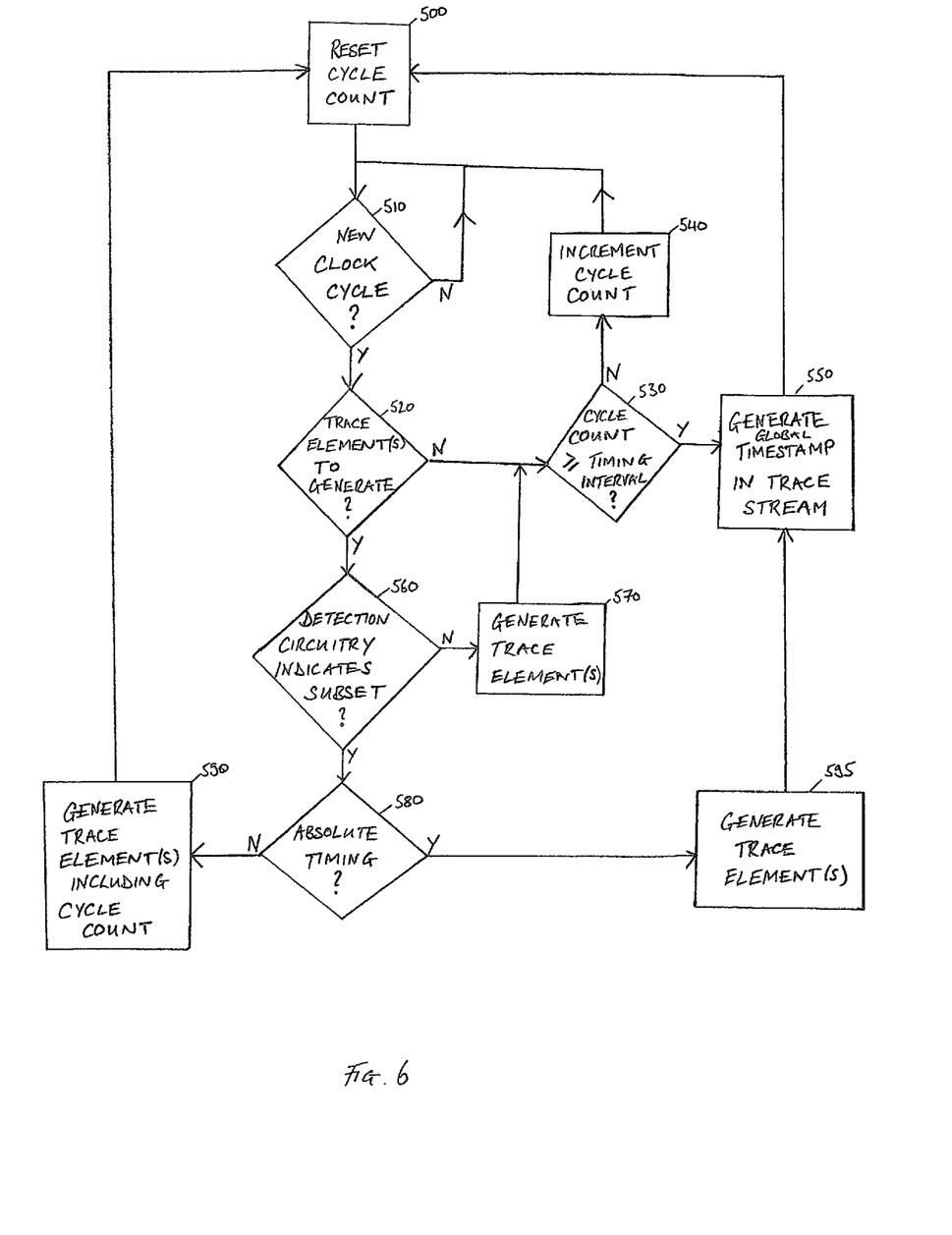
FIG. 6 is a flow diagram illustrating in more detail a sequence of steps performed within the trace generator of FIG. 3.

FIG. 6 is a flow diagram providing more detail of the timing indication generation of the trace generator 120, in an embodiment where global timestamps are regularly added to the trace stream and timing indications may be added to the trace stream (when an activity within the subset of activities is detected) either by adding a global timestamp or by adding a local (relative) timing indication. Once more, it should be noted that the sequence of steps is described here with reference to the embodiment illustrated in FIG. 3, but a similar series of steps is carried out by the trace generators in other example embodiments (e.g. that illustrated in FIG. 4).

The flow begins at step 500, where a cycle counter is reset. This cycle counter is within relative time counter 220. The series of steps in FIG. 6 is described in terms of what happens on a per-cycle basis, and at step 510 the flow pauses until the start of a new clock cycle. On the start of a new clock cycle, at step 520 it is determined if trace element (or elements) need to be generated from the stream of data elements the trace element generation circuitry is receiving. If not, then the flow proceeds to step 530, where it is determined if the cycle count has reached a predetermined (maximum) timing interval between timing indications in the trace stream. If it has not, then at step 540 the cycle count is incremented and the flow returns to step 510, waiting for the next clock cycle. If the timing interval has been reached, then at step 550 the trace generator 120 adds a global timestamp to the trace stream, making use of the signal from the global timestamp source 230. It will be appreciated that, in one particular embodiment, the timing interval may be set such that it is never reached (i.e. setting an "infinite" interval) so that global timestamps are never added to the trace stream. The flow then returns to step 500, resetting the cycle count.

If however, at step 520, it is determined that a trace element (or elements) needs generating, then at step 560 it is determined if the signal received by the trace element generation circuitry 210 from detection circuitry 200 indicates that the activity of which that trace element (or elements) is indicative is one of the predetermined subset of activities. If it is not, then at step 570 the trace element generation circuitry 210 generates the trace element (or trace elements) corresponding to that activity and the flow proceeds to step 530.

If however, at step 560, the signal received from detection circuitry 200 indicates that the activity is indeed one of the predetermined subset of activities, then at step 580 it is determined if (e.g. configured by the control logic 110 and/or control registers 140) absolute (or relative) timing is required for the timing indications for the predetermined subset of activities. If relative timing is required, then at step 590 the trace element generation circuitry 210 generates the trace element (or trace elements) corresponding to that activity, including therewith the cycle count as a timing indication. The flow then returns to step 500. If absolute timing is required then at step 595 the trace element generation circuitry 210 generates the trace element (or trace elements) corresponding to the activity, and the flow proceeds to step 550, where the trace generator 120 adds a global timestamp to the trace stream, making use of the signal from the global timestamp source 230. The flow then returns to step 500.

Figure 7:
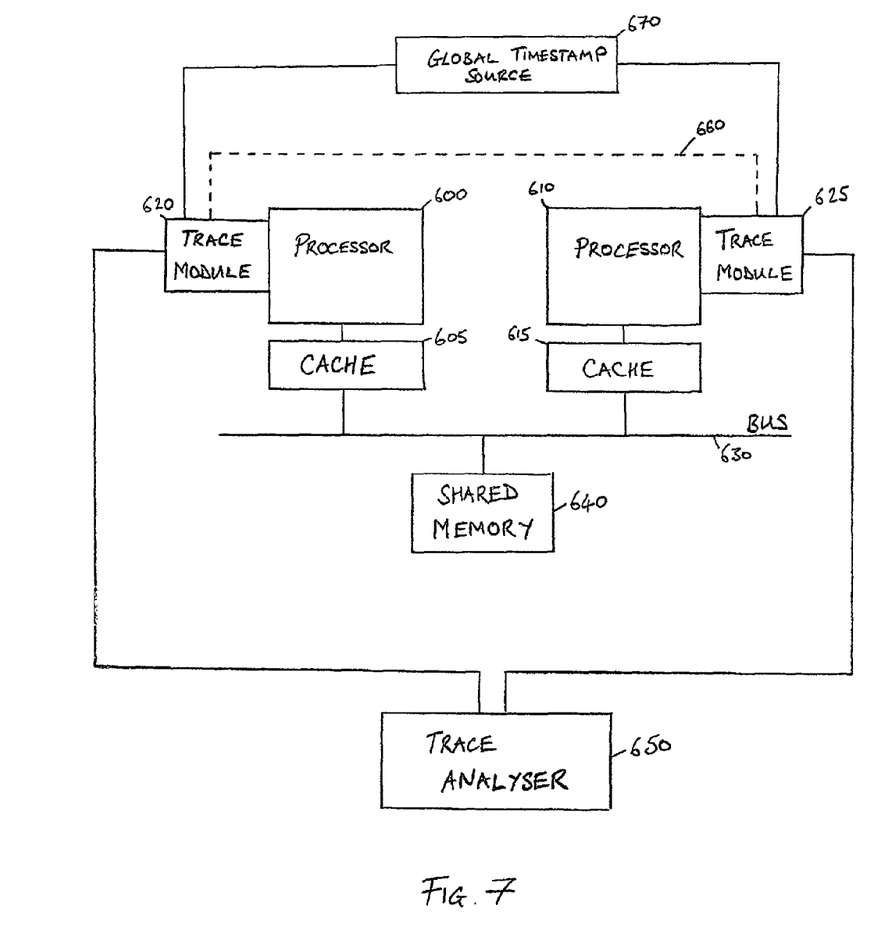
FIG. 7 is a block diagram of a data processing system in accordance with one example embodiment.

FIG. 7 is a block diagram of a data processing system in accordance with one example embodiment, comprising multiple processors. Processor 600 and processor 610 each have an associated local cache 605 and 615, respectively. Each processor also has an associated trace module, 620 and 625, respectively. Each processor can access a shared memory 640, via shared bus 630. Each trace module can receive a timing signal from global timestamp source 670.

The trace modules 620 and 625 each generate a stream of trace elements, indicative of the activities of their respective processor. These trace streams are received by trace analyser 650. The programmer of this data processing system can make use of the trace analyser 650 to study the behaviour of the data processing system when executing program code. In particular, by bringing together the trace streams from each trace module, the trace analyser can produce correlated trace streams indicative of the relative activities of processors 600 and 610. For example, global timestamps in each of the two trace streams may be compared to provide information about the relative timing (with respect to the other processor) of certain activities of one processor.

In order to further enhance the ability of the programmer to study the behaviour of the two processors, the data processing system may further be provided with trace module interconnect 660. One trace module may then make use of interconnect 660 to signal to the other trace module. For example, when one trace module adds a timing indication to its generated stream of trace elements, it can signal this fact to the other trace module, which in response may also add a timing indication to its own stream of trace elements. Since timing indications have then been (nearly simultaneously) added to the two trace streams, this provides a useful correlation point for the trace analyser to match up the trace streams from the two sources. Furthermore, synchronisation of these timing indications is facilitated by each trace module receiving a global timestamp signal from the shared global timestamp source 670 from which it can generate a global timestamp timing indication within the trace elements it produces.

As mentioned above, an example of an activity of monitored circuitry, which could be identified as part of the predetermined subset of activities, is the execution of a barrier instruction. In the situation where both processor 600 and 610 implement out-of-order instruction execution, instructions in program code written for execution on the data processing apparatus may not be executed in the order they appear in the program code. This can make the task of the programmer, seeking to study the behaviour of the system by use of the trace analyser 650, more difficult since instructions being executed by the two processors may execute in a different order to the order they might be expected to execute in from inspection of the program code. Pipelining, write buffering, caching, speculation and other micro-architectural performance enhancing techniques may also lead to difficulties in knowing when particular activities in each processor took place relative to one another.

By executing a barrier instruction on one or both of the processors, it can be ensured that the effects of instructions coming before the barrier instruction in program code are perceived from outside that processor to occur before the effects of instructions after the barrier instruction. In a multi-processor system, the execution of a barrier instruction then presents a useful activity of a processor to mark in the trace stream with a timing indication, since then not only can the timing indication be correlated with the activities of the other processor, it can be guaranteed that the effects of instructions coming before that barrier instruction (e.g. a write to the shared memory 640) will be perceived by the other processor before that point in time.

Hence, embodiments provide a data processing apparatus, comprising monitored circuitry for performing activities, trace circuitry for producing a stream of trace elements representative of at least some of these activities and detection circuitry for detecting the occurrence of a predetermined subset of the activities for which the trace circuitry is producing trace elements. When an activity in that predetermined subset of activities is detected a timing indication is added to the stream of trace elements. In this way, the valuable trace bandwidth may be preserved, by limiting the trace elements for which a timing indication is added into the trace stream to a predetermined subset of the activities for which trace elements are generated. Thus, the valuable global or relative timing accuracy of those activities represented in the trace stream is retained, without flooding the trace stream with timing indications.

Although particular example embodiments have been described herein, it will be apparent that the claims are not limited thereto, and that many modifications and additions may be made.

We claim:

1. A data processing apparatus comprising:
   monitored circuitry configured to perform activities;
   trace circuitry configured to produce a stream of trace elements representative of at least some of said activities; and
   detection circuitry, separate from said monitored circuitry, configured to detect occurrence of a predetermined subset of said activities for which said trace circuitry is producing trace elements and to cause a timing indication to be added to said stream of trace elements in association with the trace elements representative of said predetermined subset of activities,
   wherein said monitored circuitry comprises one or more processing units configured to execute instructions, and said predetermined subset of activities comprises execution of one or more predetermined instructions by the one or more processing units of said monitored circuitry.

2. The data processing apparatus as claimed in claim 1, wherein said monitored circuitry is configured to produce a stream of data elements representative of said activities and said detection circuitry detects said occurrence of said predetermined subset of said activities from observation of said stream of data elements.

3. The data processing apparatus as claimed in claim 1, wherein said monitored circuitry is configured to produce a stream of data elements representative of said activities, and wherein said detection circuitry is associated with said monitored circuitry, said detection circuitry is configured to detect said occurrence of said predetermined subset of said activities from observation of said monitored circuitry, and said detection circuitry is configured to add at least one data element to said stream of data elements in order to cause said timing indication to be added to said stream of trace elements.

4. The data processing apparatus as claimed in claim 1, wherein said detection circuitry detects occurrence of said one or more predetermined instructions from observation of instruction decoding in said monitored circuitry.

5. The data processing apparatus as claimed in claim 1, wherein one of said one or more predetermined instructions is a barrier instruction, said barrier instruction ensuring that the effects of instructions before said barrier instruction are perceived from outside said processing unit executing said barrier instruction to occur before effects of instructions after said barrier instruction.

6. The data processing apparatus as claimed in claim 1, wherein said predetermined subset of activities comprises access to at least one predetermined memory location by said monitored circuitry.

7. The data processing apparatus as claimed in claim 1, wherein said predetermined subset of activities comprises a procedure call.

8. The data processing apparatus as claimed in claim 1, wherein said predetermined subset of activities comprises a procedure return.

9. The data processing apparatus as claimed in claim 1, wherein said trace circuitry is configured to include, as an additional timing indication, an absolute timestamp in said trace elements if a predetermined period elapses without an activity in said predetermined subset of activities being detected.

10. The data processing apparatus as claimed in claim 1, wherein said timing indication comprises an absolute timestamp.

11. The data processing apparatus as claimed in claim 1, wherein said timing indication comprises an indication of time elapsed since a previous timing indication.

12. The data processing apparatus as claimed in claim 1, wherein when said trace circuitry causes a timing indication to be included in the stream of trace elements, a timing signal is issued to further trace circuitry.

13. The data processing apparatus as claimed in claim 1, wherein said trace circuitry is further configured to receive a timing signal from further trace circuitry and on receipt of said timing signal from further trace circuitry to cause a timing indication to be included in the stream of trace elements.

14. A data processing system comprising:
a first data processing apparatus; and
a second data processing apparatus;
wherein each of the first data processing apparatus and second data processing apparatus are a data processing apparatus as claimed in claim 1.

15. A trace analysing apparatus for receiving a trace stream from each of said first and second data processing apparatuses as claimed in claim 14, said trace analysing apparatus configured to correlate the trace streams on the basis of timing indications in each stream to provide correlated trace streams indicative of the activities of the monitored circuitry of each data processing apparatus.

16. A method of operating a data processing system including monitored circuitry having one or more processing units for executing instructions, comprising the steps of:

performing activities in said monitored circuitry;
producing a stream of trace elements representative of at least some of said activities;
detecting in detecting circuitry separate from said monitored circuitry occurrence of a predetermined subset of said activities for which said producing step produces trace elements; and
said detecting circuitry causing a timing indication to be added to said stream of trace elements in association with the trace elements representative of said predetermined subset of activities,
wherein said predetermined subset of activities comprises execution of one or more predetermined instructions by the one or more processing units of said monitored circuitry.

17. A data processing apparatus comprising:
monitored means for performing activities;
trace means for producing a stream of trace elements representative of at least some of said activities; and
detection means, separate from said monitored means, for detecting occurrence of a predetermined subset of said activities for which said trace means is producing trace elements and for causing a timing indication to be added to said stream of trace elements in association with the trace elements representative of said predetermined subset of activities,
wherein said monitored means comprises one or more processing units configured to execute instructions, and said predetermined subset of activities comprises execution of one or more predetermined instructions by the one or more processing units of said monitored means.

* * * * *